UNITED STATES PATENT OFFICE 2,366,874

COMPOSITION OF MATTER

Orland M. Reiff, Woodbury, N. J., assignor to Socony-Vacuum Oil Company, Incorporated, a corporation of New York No Drawing. Original application April 10, 1940, Serial No. 328,873. Divided and this application August 5, 1942, Serial No. 453,725

11 Claims. (Cl. 252—1)

This invention has to do with new chemical compounds or reaction products which may be generally designated as the metal salts of alkylated hydroxyaromatic sulfides or as the sulfides of alkyl-substituted aryl metal oxides or hydroxylates. Although the invention is broadly concerned with chemical compounds or compositions coming within the above-designated general classification, it contemplates as a preferred group coming within such general classification those compounds or condensation products which are soluble or miscible with mineral oil.

My invention is predicated upon the discovery that the oil-miscible compounds or condensation products contemplated herein when blended with a viscous mineral oil fraction, such as a hydrocarbon lubricating oil, will improve the oil in various respects. For example, I have found that the compounds or reaction products contemplated herein will inhibit oxidation of the oil, thereby retarding the formation of sludge and acidic products. They also have a peptizing action on such sludge as may be present or as may eventually be formed. Thus, any one of these preferred oil-miscible compounds or condensation products may, for example, be used in internal combustion engine lubricants to retard or prevent the sticking of piston rings, the clogging of piston ring slots, the corrosion of bearings and other parts susceptible to attack by acidic products of oxidation in the oil, and through a proper choice of metal substituent (lead, copper, tin, or zinc, for example) the load-carrying ability or lubricity of the oil may be improved.

The alkyl substituents on the aryl nuclei of the compounds or condensation products contemplated herein act to impart oil-miscibility to the product and for the preferred general class of oil-miscible compounds these alkyl substituents should contain at least 10 carbon atoms. Within this preferred general class of oil-miscible compounds special preference is given to compounds wherein the alkyl substituents contain at least twenty carbon atoms. This especially-preferred sub-group of compounds having the so-called "heavy alkyl groups" of at least twenty carbon atoms (such as are derived, for example, from Friedel-Crafts condensation with chlorinated paraffin wax) act to improve the oil in the same respects noted above, and in addition they improve the viscosity index and pour point of the oil.

It is to be understood that the present invention is not concerned with mineral oil compositions, such compositions forming the subject matter of my copending application Serial No. 328,873, filed April 10, 1940, (which in turn is a continuation-in-part of my application Serial No. 222,755, filed August 3, 1938, and now issued as Patent No. 2,197,835), of which the present application is a division and to which reference is made for further details in the composition of these compounds or reaction products.

It is also to be understood that the present invention is not confined to the oil-miscible or oil-soluble compounds and that the use of the preferred oil-miscible compounds is not confined to the improvement of mineral oils, since this whole class of new materials is possessed of valuable properties irrespective of oil-miscibility. For example, the compounds or condensation products contemplated herein may be used as intermediaries in the production of resins, resin-like materials, rubber substitutes, etc. Certain of the compounds or compositions are possessed of valuable pharmaceutical, insecticidal, or similar properties, such, for example, as those derived from the presence of a particular metal or metaloxy group. Numerous other uses and applications of the compounds or condensation products contemplated herein will be readily apparent to those skilled in the art from the following description of their compositions and a typical method for synthesizing them.

As aforesaid, the compounds or condensation products contemplated herein may be broadly designated as the sulfides of alkyl-substituted aryl metal oxides or hydroxylates. Thus, they may be considered as the sulfides (thio ethers and polysulfides) of the alkyl-substituted aryl metal hydroxylates disclosed and claimed in Patent No. 2,252,663, issued to me on August 12, 1941, which are obtained by condensation with a sulfur halide as disclosed in the parent application Serial No. 222,755 hereinabove referred to. Thus, a typical compound or condensation product of the type contemplated herein may be represented by the general formula I 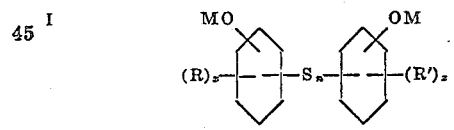

wherein R and R' represent aliphatic hydrocarbon groups; $x$ represents an integer from 1 to 3; M represents the hydrogen equivalent of a mono- or poly-valent metal; and $n$ represents an integer from 1 to 4. As aforesaid, such a compound may be designated as a metal salt of an alkylated hydroxyaromatic (phenol) sulfide. It will be observed that this compound is a condensation product of an alkyl-substituted aryl metal oxide in which the oxygen of the metal oxide group is directly attached to the aryl nucleus and in which at least two alkyl-substituted aryl nuclei are interconnected by at least one atom of sulfur.

It is to be understood, of course, that the aryl nucleus (disclosed in the formula above as a substituted phenyl group) may be either mono- or poly-cyclic; also that it may carry other substituents, such as ester, keto, alkoxy, alkyl sulfide, aryl sulfide, halogen, amino, etc., as more fully disclosed in application Serial No. 328,873, of which this is a division.

In general it appears that any metal may be employed as the metal M in compounds or condensation products of the aforesaid type to provide valuable oil addition agents. The metals contemplated herein may be broadly classified as metals of groups I to VIII, inclusive, of the periodic system. These metals comprise the following: the alkali metals: lithium, sodium, potassium, rubidium, and caesium; the alkaline earth group: beryllium, magnesium, calcium, strontium, and barium; the metals zinc, cadmium, mercury, scandium; the metals aluminum, gallium, indium, thallium, titanium, zirconium, cerium, thorium; germanium, tin, and lead; vanadium, columbium, and tantalum; arsenic, antimony, and bismuth; chromium, molybdenum, tungsten, and uranium; rhenium, manganese, iron, cobalt, and nickel; ruthenium, rhodium, and palladium; osmium, iridium, and platinum.

Some of the rare earth metals are given in the foregoing. Other rare earth metals suitable for use in the metal oxide group of the sulfides of alkylated aryl metal oxides contemplated herein are those now commercially available as the cerium and yttrium group: namely, a mixture of praseodymium, neodymium, samarium, europium, gadolinium, terbium, dysprosium, holmium, erbium, thallium, and lutecium.

As aforesaid, the term "sulfide," as used herein, is inclusive of the monosulfides, disulfides, trisulfides, tetrasulfides, etc.; that is, it includes both monosulfides and polysulfides and is also inclusive of such polymers and related complex derivatives as may be formed by the hereinafter-described procedures. The general procedure for synthesizing the sulfides of alkylated aryl metal oxides is to first form the alkylated hydroxyaryl sulfide and then substitute the hydroxyl hydrogen with metal.

The alkylated hydroxyaryl sulfides can be prepared by the reaction of alkylated hydroxyaromatic compounds such as an alkyl-substituted phenol with sulfur or with sulfur halides. With sulfur dichloride, for example, the thio ether with the monosulfide linkage ($n=1$ in general Formula I) is formed, and with sulfur monochloride the disulfide linkage ($n=2$) is formed. By reaction with elementary sulfur, the main products contain monosulfide linkages with $H_2S$ evolved in the condensation reaction. Sulfur condensation products or "sulfides" of higher sulfur content can be formed by ($a$) reaction of alkylated thio phenols (aryl mercaptans) with sulfur monochloride or sulfur dichloride, and ($b$) reaction of a compound having a disulfide linkage with sulfur, or alkali polysulfides or alkyl tetrasulfide.

The alkylation of the hydroxyaromatic compound may be carried out in various ways. A preferred procedure is to subject a hydroxyaromatic compound or an oxyaromatic compound to a Friedel-Crafts condensation reaction with a halogenated aliphatic hydrocarbon, which for obtaining the preferred multifunctional addition agents should be an aliphatic hydrocarbon containing at least twenty carbon atoms or a mixture of aliphatic compounds predominantly comprised of compounds having at least twenty carbon atoms. This alkylation may also be carried out with unsaturated hydrocarbons or aliphatic alcohols, using $H_2SO_4$ or anhydrous aluminum chloride as a catalyst. In alkylating phenols with high molecular weight alcohols, however, it is preferred to convert the alcohol to the corresponding halide (or polyhalide) and then condense the alkyl halide with the hydroxyaromatic compound by the Friedel-Crafts reaction. For obtaining the preferred multifunctional addition agent with unsaturated hydrocarbons or aliphatic alcohols they should be high molecular weight compounds containing at least twenty carbon atoms, such, for example, as eicosylene, cerotene, melene, polymerized isobutylene, etc., and myricyl alcohol, ceryl alcohol, etc.

The Friedel-Crafts synthesis is preferred for obtaining the alkylated hydroxyaromatic compound, and as a source of the alkyl substituent preference is given to mixed high molecular weight hydrocarbons typified by those which characterize the heavier products of petroleum, such as heavy petroleum oils of the lubricant type, petrolatum and crystalline petroleum wax or other compounds which will result in relatively long chain aliphatic substituents. Special preference is given to petroleum wax (paraffin wax) of melting point not substantially less than about 120° F., which is predominantly comprised of aliphatic hydrocarbons having a molecular weight of at least 350 and containing at least twenty carbon atoms.

Hydroxyaromatic compounds which may be used in the alkylation reaction are mono- or poly-cyclic and mono- or poly-hydric hydroxyaromatic compounds which may or may not be otherwise substituted. Specific examples of compounds which may be used in this reaction are: phenol, resorcinol, hydroquinone, catechol, cresol, xylenol, hydroxydiphenyl, benzylphenol, phenyl-ethyl phenol, phenol resins, methyl hydroxydiphenyl, alpha and beta naphthol, xylyl naphthol, benzyl phenol, anthranol, phenyl-methyl naphthol, phenanthrol, anisole, beta-naphthyl methyl ether, chlorphenol, and the like. Preference in general is to the monohydroxy phenols otherwise unsubstituted, particular preference being given to phenol and alpha and beta naphthol. Mixed alkyl-aryl and aralkyl-aryl ethers such as anisole and beta-naphthyl methyl ether are given as examples because the Friedel-Crafts reaction with these ethers is accompanied by some rearrangement, yielding free hydroxyl groups.

Where it is desired to obtain a compound or condensation product in which the aryl nucleus contains in addition to, or instead of, residual hydrogen another substituent in addition to the oil-solubilizing alkyl group, it is pointed out that with the exception of substituents such as aralkyl, aryl, alkaryl, halogen, hydroxyl, and aroxy, such substituent groups are introduced after alkylation of the hydroxyaromatic compound. The usual methods for the introduction of these substituents into non-alkylated hydroxyaromatic compounds may be employed in connection with the alkylated hydroxyaromatic compounds contemplated herein. Methods for the introduction of such substituents along with phenolic —OM groups will be apparent from methods described in my aforesaid copending application Serial No. 328,873.

As aforesaid, the preferred products contemplated herein are those having multifunctional properties wherein the alkyl substituent in the aryl nucleus contains at least twenty carbon atoms. In this preferred class of compounds special preference is given to the condensation products derived from alkyl-substituted hydroxyaromatic compounds in which the alkyl substituent is derived from petroleum wax. The details in a typical procedure for synthesizing these so-called wax substituted hydroxyaromatic compounds (wax-phenol) are described in my prior application Serial No. 206,683, now issued as Patent No. 2,197,833. Briefly, this procedure involves reacting a chlorinated wax such as chlorinated paraffin wax with a phenol in the presence of a Friedel-Crafts catalyst at elevated temperature. The chlorinated wax should have a chlorine content of from 10 per cent to 16 per cent, and the reaction mixture may contain about three atomic proportions of chlorine (in a chlorwax of 16 per cent chlorine content) to one molecular proportion of phenol. A "wax-phenol" obtained from such a reaction mixture may be designated as wax-phenol (3–16). Parenthetical expressions of the type (A—B) will be used hereinafter in connection with the wax-substituted derivatives to designate (A) the number of atomic proportions of chlorine in the chlorinated wax reacted with one mol of hydroxyaromatic compound and (B) the chlorine content of the chlorinated wax. In the above example A=3 and B=16. The same designation will also apply to the sulfides of the wax-aryl metal oxides which constitute the ultimate product derived from the wax-phenol.

Illustrative procedures which may be followed in preparing the sulfides of alkyl-substituted hydroxyaromatic compounds and the sulfides of alkylated aryl metal oxides derived therefrom are given in the following examples, wherein the "alkylated phenol" is preferably a wax-substituted phenol of the type last-described above for obtaining the "wax"-substituted derivatives which are especially preferred because of their multifunctional oil-improving properties.

EXAMPLE ONE

SYNTHESIS OF ALKYLATED HYDROXYARYL SULFIDES

A. Monosulfide linkage

*Reaction mixture*

| | |
|---|---|
| Alkylated phenol_____mol__ | 1 |
| Sulfur dichloride_____mol__ | ½ |
| Carbon disulfide, benzene, chlorbenzene, or ethylene dichloride as solvent part by weight__ | 1 |

B. Disulfide linkage

*Reaction mixture*

| | |
|---|---|
| Alkylated phenol_____mol__ | 1 |
| Sulfur monochloride_____mol__ | ½ |
| Carbon disulfide, benzene, chlorbenzene, or ethylene dichloride as solvent part by weight__ | 1 |

PROCEDURE

The alkylated phenol is dissolved in the solvent and brought to a temperature of about 100° F., followed by addition of the sulfur halide. The sulfur halide is introduced slowly, requiring about ½ hour for the addition, followed by refluxing the mixture about one hour to complete the reaction. HCl is evolved in the reaction, resulting in fixation of sulfur in the aryl nucleus. After completion of the condensation reaction, the mixture is water-washed to remove the dissolved hydrochloric acid, followed by removal of diluents to give the finished product.

C. Tri- or tetra-sulfide linkage

By reaction of the disulfide type of compound with elementary sulfur or alkali polysulfides or alkyl tetrasulfides, one or two atoms of sulfur can be added to the disulfide linkage, resulting in formation of the tri- or tetra- sulfide derivative, respectively. The use of alkyl tetrasulfides is preferred in this type of reaction.

*Reaction mixture*

| | |
|---|---|
| Alkylated phenol disulfide_____mol__ | 1 |
| Ethyl tetrasulfide_____mol__ | 1 |
| Carbon disulfide or ethylene dichloride as solvent_____part by weight__ | 1 |

PROCEDURE

The alkylated phenol disulfide, in solution in carbon disulfide, benzene, chlorbenzene, or ethylene dichloride, is brought to a temperature of about 100° F. and treated with the ethyl tetrasulfide, followed by refluxing the mixture during a one-hour period to complete the addition of sulfur. The solvent is then distilled to give the finished product.

EXAMPLE TWO

METAL DERIVATIVES OF ALKYLATED HYDROXYAROMATIC SULFIDES

The metal oxides (phenates, naphtholates, etc.) of alkylated aromatic sulfides may be obtained and purified according to the same general procedures described in my prior application Serial No. 206,683 for synthesizing alkylated aryl metal oxides.

In the formation of the alkali metal derivative, the alkylated phenol sulfide is reacted with an alcoholate of the desired alkali metal. In the formation of derivatives of other classes of metals, the preferred procedure consists in treating the alkylated phenol sulfide with an equivalent of the salt of the desired metal in alcohol solution, followed by reaction with an equivalent amount of a sodium alcoholate, resulting in the formation of the alcoholate of the desired metal as the initial product. By heating the mixture to about 300° F. for a period of about one hour, the metal alcoholate is reacted with the hydroxyl group resulting in the formation of the metal phenate derivative. Normal inorganic or fatty acid salts as well as the oxy salts thereof can be used in the formation of the metal derivatives.

Typical compounds or condensation products obtained according to the foregoing procedure where wax-phenol (3–16), for example, was used as the initial reactant may be designated as metal phenates of wax-phenol disulfide (3–16); metal phenates of wax-phenol monosulfides (3–16), etc. Where a wax-substituted naphthol is used as the initial reactant, the products may be similarly designated as metal naphtholates of wax-naphthol sulfides.

It will be understood that when a mixture of aliphatic hydrocarbon compounds, such as petroleum wax, for example, is used as the source of the alkyl substituents, the resulting composition will be an intimate mixture of compounds or sulfides of alkyl-substituted aryl metal oxides (sulfides of alkyl-substituted aromatic hydroxylates in which the hydroxyl hydrogen is substituted with the same metal), which compounds differ from each other with respect to the nature of the alkyl substituent. In other words, where the alkylation of the aryl nucleus has been effected with a mixture of aliphatic hydrocarbons, the resulting product will likewise be a mixture of compounds differing with respect to the alkyl substituent but having in common the same metal oxide (—OM) group and the same characterizing aryl nucleus discussed above.

Compounds or condensation products of both the oil-miscible and non-miscible types have been prepared, and of the oil-miscible products which have been tested in mineral oil compositions all have effected improvement in the properties of the oil. The following list is illustrative of the various oil-miscible sulfides of wax-substituted aryl metal oxides which I have prepared and tested to demonstrate their value as addition agents for viscous mineral oils.

*Table*

Cobaltous phenate of wax-phenol disulfide (3–16)
Stannous phenate of wax-phenol disulfide (3–16)
Aluminum phenate of wax-phenol disulfide (3–16)
Sodium phenate of wax-phenol disulfide (3–16)
Calcium phenate of wax-phenol disulfide (3–14)
Barium phenate of wax-phenol disulfide (3–14)
Cobaltous phenate of wax-phenol monosulfide (3–16)
Stannous naphtholate of wax-phenol disulfide (3–15)

It is to be understood that although I have described certain preferred procedures for synthesizing the products contemplated by this invention and have listed a number of illustrative compounds or condensation products which are typical thereof, the invention is not limited to the particular procedures or products but includes within its scope such changes and modifications as fairly come within the spirit of the appended claims.

I claim:

1. As a new composition of matter, an oil-miscible condensation product of a wax-substituted aryl metal oxide in which the oxygen of the metal oxide group is directly attached to the aryl nucleus and in which at least two wax-substituted aryl nuclei are interconnected by at least one atom of sulfur.

2. A composition of matter as defined in claim 1 wherein the metal is selected from the group consisting of cobalt, tin, aluminum, barium, calcium, and sodium.

3. As a new composition of matter, a metal salt of an alkylated phenol sulfide having the general formula

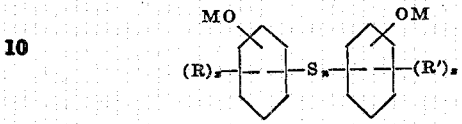

in which R and R' represent aliphatic hydrocarbon groups containing at least twenty carbon atoms; $x$ is selected from the integers 1, 2, and 3; M represents the hydrogen equivalent of a metal; and $n$ is selected from the integers 1 to 4.

4. As a composition of matter, an intimate mixture of oil-miscible metal salts of alkylated hydroxyaromatic sulfide compounds wherein the hydroxyl hydrogen atoms of said compounds are substituted with the same metal; the alkyl substituents in said compounds are attached to the aryl nuclei and consist of aliphatic hydrocarbon radicals containing at least 20 carbon atoms and corresponding substantially to the different aliphatic hydrocarbons contained in paraffin wax; and each of said compounds is characterized by at least two of the substituted aryl nuclei which are interconnected by at least one atom of sulfur.

5. A composition of matter as defined in claim 1 in which the metal is calcium.

6. A composition of matter as defined in claim 1 in which the metal is barium.

7. A composition of matter as defined in claim 1 in which the metal is tin.

8. A composition of matter as defined in claim 3 wherein the metal is selected from the group consisting of cobalt, tin, aluminum, barium, calcium and sodium.

9. A composition of matter as defined in claim 3 in which the metal is calcium.

10. A composition of matter as defined in claim 3 in which the metal is barium.

11. A composition of matter as defined in claim 3 in which the metal is tin.

ORLAND M. REIFF.